(12) United States Patent
Duplain et al.

(10) Patent No.: US 10,082,437 B2
(45) Date of Patent: Sep. 25, 2018

(54) OPTICAL PRESSURE SENSOR WITH REDUCED MECHANICAL STRESSES

(71) Applicant: Opsens Solutions Inc., Quebec City (CA)

(72) Inventors: Gaétan Duplain, Quebec City (CA); Sylvain Bussière, L'Ancienne Lorette (CA); Philippe Lafleur, Quebec City (CA)

(*) Notice: Subject to any disclaimer, the term of this patent is extended or adjusted under 35 U.S.C. 154(b) by 73 days.

(21) Appl. No.: 15/271,987

(22) Filed: Sep. 21, 2016

(65) Prior Publication Data

US 2017/0082514 A1    Mar. 23, 2017

Related U.S. Application Data

(60) Provisional application No. 62/221,313, filed on Sep. 21, 2015.

(51) Int. Cl.
| | |
|---|---|
| *G01L 9/00* | (2006.01) |
| *G01L 13/02* | (2006.01) |
| *G01L 19/00* | (2006.01) |

(52) U.S. Cl.
CPC .......... *G01L 9/0079* (2013.01); *G01L 13/023* (2013.01); *G01L 13/025* (2013.01); *G01L 19/0046* (2013.01)

(58) Field of Classification Search
None
See application file for complete search history.

(56) References Cited

U.S. PATENT DOCUMENTS

| | | | | |
|---|---|---|---|---|
| 5,414,509 | A | * | 5/1995 | Veligdan ................. G01L 11/02 356/35.5 |
| 7,614,308 | B2 | | 11/2009 | Berner et al. |
| 9,775,523 | B2 | * | 10/2017 | Gregorich .......... A61B 5/02007 |
| 9,782,129 | B2 | * | 10/2017 | Radman ............... A61B 5/6851 |
| 2009/0151423 | A1 | | 6/2009 | Wu et al. |

FOREIGN PATENT DOCUMENTS

| | | |
|---|---|---|
| CA | 2496144 | 8/2005 |
| JP | 2008107295 | 5/2008 |

OTHER PUBLICATIONS

International Search Report PCT/CA2016/051101, dated Sep. 21, 2016.

* cited by examiner

*Primary Examiner* — Andre Allen
(74) *Attorney, Agent, or Firm* — Benoit & Cote, Inc.; C. Marc Benoit

(57) ABSTRACT

There is described an optical pressure sensor comprising a sensor housing and an optical pressure cell mounted within the sensor housing and dividing the sensor housing into a first fluid space and a second fluid space. The optical pressure cell comprises a front side exposed to a pressure in the first fluid space and a back side exposed to a pressure in the second fluid space. The optical pressure sensor further comprises a fluid communication arrangement allowing pressure equalization between the pressure in the first fluid space on the front side and the pressure in the second fluid space on the back side of the optical pressure cell.

15 Claims, 6 Drawing Sheets

OPTICAL PRESSURE SENSOR WITH REDUCED MECHANICAL STRESSES

CROSS-REFERENCE TO RELATED APPLICATION

The present application claims priority from U.S. provisional patent application No. 62/221,313 filed on Sep. 21, 2015 which is hereby incorporated by reference

BACKGROUND (a) Field

The present invention relates to optical pressure sensors, and more specifically to optical pressure sensors based on the Fabry-Perot interferometer.

The subject matter disclosed generally relates to the design of a new optical pressure sensor undergoing less mechanical stresses having detrimental impact on the performance of the sensor.

(b) Related Prior Art

There is a variety of existing optical pressure sensors based on the Fabry-Perot interferometer. These types of sensors often differ by their optical assembling and mechanical mounting methods. For example, U.S. Pat. No. 7,689,071 by Belleville teaches that the construction of a Fabry-Perot pressure sensor comprises a bi-directional optical fiber that guides light waves toward a Fabry-Perot-based optical pressure cell made from a glass substrate (the sensor body) and a silicon deflecting diaphragm. A first reflective mirror is deposited within a recessed cavity performed on the top surface of the glass substrate. A deformable silicon diaphragm is bonded or welded to the glass substrate to form a second mirror and also to tightly seal the recessed cavity. The two mirrors, spaced by a distance given by the depth of the recessed cavity constitute a Fabry-Perot interferometer. The depth of the recessed cavity, called the cavity length of the Fabry-Perot interferometer, varies as a function of the differential pressure that may exist between the inside and the outside of the sealed cavity. This optical pressure cell is mounted at the end of an optical fiber within a receiving cavity created in the sensor body of the cell. The receiving cavity is filled with adhesive to secure the cell in place and to seal the whole assembly. One major drawback of this method is the use of adhesive for sealing and bonding. Such sealing and bonding method can only work in low differential pressure environments. Another drawback of this method is that the sensor body needs to be thin (of the order of 200 microns) because no lenses are used to bring the light waves to the pressure cell. Thin optical components are more prone to optical distortion, which may affect the pressure measurement. Another drawback of this method is that the sealing body is applied against the sensor body. Therefore the resulting mechanical force which is required for leak-tight sealing are transferred to the sensor body creating internal stresses in the sensor body. This again can lead to optical distortion of the pressure cell and then affect the accuracy of the pressure measurements.

U.S. Pat. No. 5,128,537 by Beat Halg teaches a different arrangement where the cavity can be put at a given pressure by using a secondary pressure port. This design has similar aforementioned drawbacks with the sealing body applied against the sensor body and the requirement of a thin sensor body.

Alternatively, in U.S. Pat. No. 4,933,545 by Saaski et al., optical lenses are used to bring the light waves to the optical pressure cell. In that case, the sensor body can be made more robust by increasing its thickness. Nevertheless, this design is also plagued with a similar aforementioned drawback because of the sealing body being applied against the sensor body. Another drawback of this arrangement is that a large differential pressure may exist between the front side and the back side of the optical pressure cell. This may result in the bending of the cell which in turn affects the pressure measurements.

Another arrangement is disclosed in U.S. Pat. No. 7,614,308 by Berner et al. A support disc is added to the optical pressure cell and the sealing body is applied against the support disc. Although the forces exerted by the sealing body are applied on the support disc, it is not possible to avoid some coupling of these forces to the optical pressure cell knowing that the support disc must be tightly sealed against the cell. Also large pressure differences that may exist between the front side and back side of this optical assembly (support disc with pressure cell) can induce the bending thereof. This in turn can result in the aforementioned optical distortion in the cell which affects the pressure measurements.

These aforementioned optical pressure cell arrangements are all exposed in one way or the other to mechanical stresses. This can have a detrimental impact on the performances of the sensor. For example, it is well known in the art that these kinds of stresses tend to relieve themselves unpredictably with time, with temperature change or under vibration and/or shock. These stress relief effects are the main source of unwanted drift of the pressure sensor. The pressure cell is also affected by the bending forces which, for instance, can severely affect the linearity of the sensor response.

There is therefore a need for a new optical pressure sensor less exposed to mechanical stresses and accordingly being designed to avoid the detrimental impacts associated to these stresses.

SUMMARY

According to an embodiment, there is provided an optical pressure sensor comprising a sensor housing and an optical pressure cell mounted within the sensor housing and dividing the sensor housing into a first fluid space and a second fluid space. The optical pressure cell comprises a front side exposed to a pressure in the first fluid space and a back side exposed to a pressure in the second fluid space. The optical pressure sensor further comprises a fluid communication arrangement allowing pressure equalization between the pressure in the first fluid space on the front side and the pressure in the second fluid space on the back side of the optical pressure cell.

According to an aspect, the sensor housing defines a conduit extending therewithin from the second fluid space to the first fluid space hence providing the fluid communication arrangement allowing fluid communication and eliminating a difference in pressure between the second fluid space and the first fluid space.

According to an aspect, the sensor housing comprises walls delimiting the first fluid space and the second fluid space, one of the walls being common to the first fluid space and the second fluid space, namely a shared wall, and the conduit extending from the second fluid space to the first fluid space is provided in the shared wall.

According to an aspect, the sensor further comprises a front wall further delimiting the first fluid space and wherein a front input pressure port is defined in the front wall and provides fluid communication between the first fluid space and an immediate environment outside the pressure sensor near the front input pressure port.

According to an aspect, the front input pressure port comprises one of a bellow and a corrugated diaphragm to communicate pressure while preventing ingress of fluid from the immediate environment outside the pressure sensor near the front input pressure port to the first fluid space.

According to an aspect, the optical pressure sensor further comprises non-sealing mounting clamps to secure the optical pressure cell to the sensor housing.

According to an aspect, the optical pressure cell comprises a Fabry-Perot cavity having a diaphragm being exposed to the pressure in the first fluid space, the optical pressure cell for measuring a pressure difference between the first fluid space and the Fabry-Perot Cavity; and where the fluid communication arrangement allows fluid communication and eliminates a difference in pressure between the second fluid space and one of the first fluid space and the Fabry-Perot cavity.

According to an aspect, the optical pressure cell defines a vent channel extending within the optical pressure cell from the second fluid space to the Fabry-Perot cavity hence providing the fluid communication arrangement allowing fluid communication and eliminating a difference in pressure between the second fluid space and the Fabry-Perot cavity.

According to an aspect, the sensor housing further comprises:
a front wall delimiting the first fluid space and wherein a front input pressure port is defined in the front wall and provides fluid communication between the first fluid space and an immediate environment outside the pressure sensor near the front input pressure port; and
a back wall delimiting the second fluid space and wherein a back input pressure port is defined in the back wall and provides fluid communication between the second fluid space and an immediate environment outside the pressure sensor near the back input pressure port.

According to an aspect, the front input pressure port and the back input pressure port each comprises one of a bellow and a corrugated diaphragm to communicate pressure while respectively preventing ingress of fluid from the immediate environment outside the pressure sensor near the front input pressure port to the first fluid space and the immediate environment outside the pressure sensor near the back input pressure port.

According to an aspect, the optical pressure sensor further comprises a soft sealing body that prevents fluid from flowing between the first fluid space and the second fluid space.

According to an aspect, the optical pressure sensor further comprises an optical fiber assembly having a distal end located in the second fluid space proximate the optical pressure cell in an operative manner for transmission and reception of light beams between the optical fiber assembly and the optical pressure cell.

According to an aspect, the sensor housing further comprises a back wall delimiting the second fluid space and wherein a hole is practiced in the back wall, wherein the optical fiber assembly passes through the hole.

According to an aspect, the optical fiber assembly comprises an optical fiber and a ferrule housing the optical fiber at the distal end of the optical fiber assembly and further wherein the hole is adapted to hold the ferrule in the back wall.

According to an embodiment, there is provided an optical pressure sensor comprising a sensor housing and an optical pressure cell mounted within the sensor housing and dividing the sensor housing into a first fluid space and a second fluid space. The optical pressure cell comprising a Fabry-Perot cavity has a diaphragm exposed to a pressure in the first fluid space. The optical pressure cell is for measuring a pressure difference between the first fluid space and the Fabry-Perot Cavity. The optical pressure sensor further comprises a fluid communication arrangement allowing fluid communication and eliminating a difference in pressure between the second fluid space and one of the first fluid space and the Fabry-Perot cavity.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Using the embodiments of a Fabry-Perot pressure sensor described herein below, one of the major issues (as those discussed herein above) encountered when designing Fabry-Perot pressure sensors is resolved, namely the mechanical stresses that can be induced on the optical pressure cell by the mounting and the packaging configuration of the Fabry-Perot pressure sensor. These stresses can have detrimental impacts on the performance of the Fabry-Perot pressure sensor like drift and high nonlinearity in the response of the pressure sensor. One cause of induced mechanical stresses is a mismatch of the coefficient of thermal expansion (CTE) between the materials of the optical pressure cell, and the materials used for sealing the optical pressure cell in its sensor housing, and the materials of the sensor housing. Another source of mechanical stress is the mechanical force between the seal body and the optical pressure cell required for leak-tight sealing. Another source of stress is the bending of the optical pressure cell due to the large pressure difference that may exist between the back side and front side of the optical pressure cell. These sources of stresses are all greatly decreased with the present solution.

Figure 1:
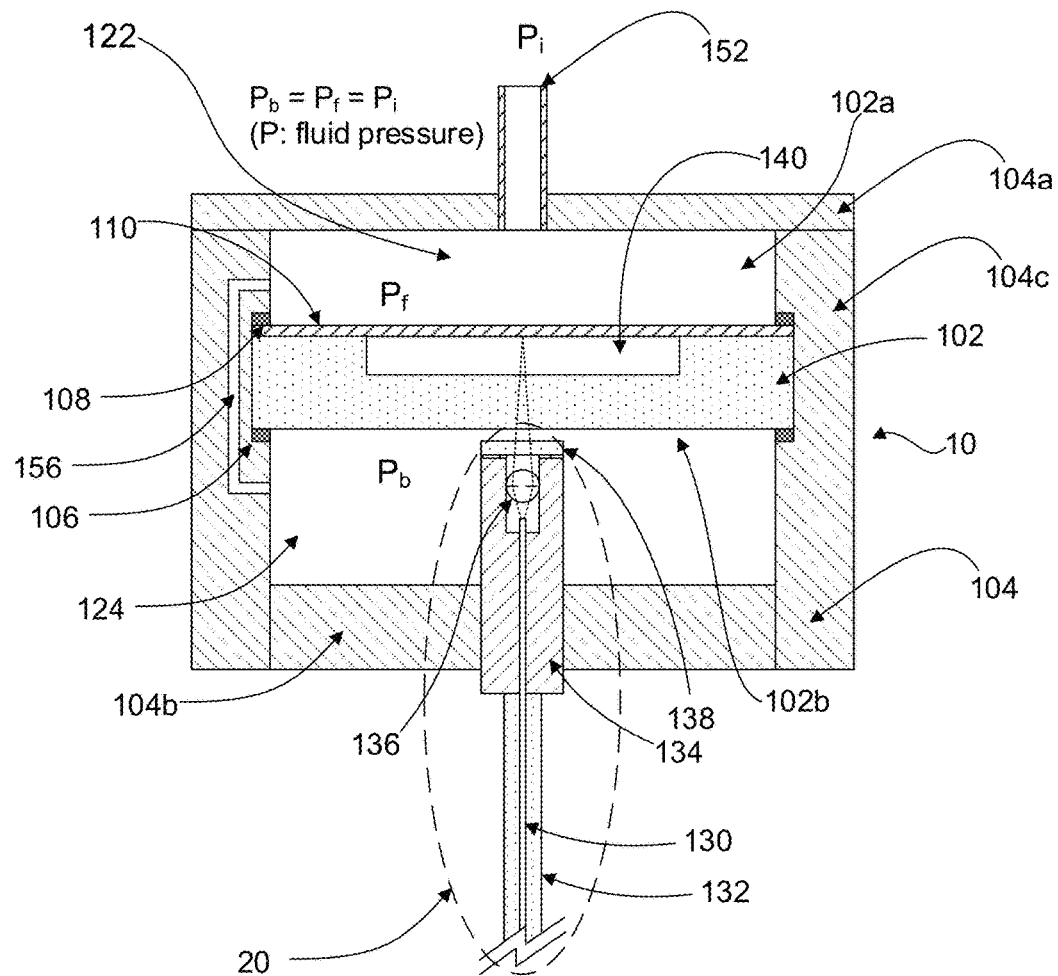
FIG. 1 is a section view illustrating an optical Fabry-Perot absolute pressure sensor in accordance with a first embodiment of the present invention.

Referring now to the drawings, and more particularly to FIG. 1, a section view of an optical Fabry-Perot absolute pressure sensor 10 is illustrated. The term "absolute pressure" is directed to the pressure existing at the front input pressure port 152 and assuming that the pressure existing in the Fabry-Perot cavity 140 is negligible when compared to that pressure. This contrasts with "differential pressure", where in this case the pressure in the Fabry-Perot cavity 140 cannot be neglected when compared to the pressure existing at the input pressure port 152.

The optical Fabry-Perot absolute pressure sensor 10 comprises an optical pressure cell 102 based on a Fabry-Perot interferometer having a front side 102a and a back side 102b. The optical pressure cell 102 is located in the sensor housing 104 inside a side wall recess 106 with soft mounting components, namely with mounting clamps 108 made with soft materials like elastomer o-rings or soft metal o-rings, securely maintaining the optical pressure cell 102 within the side wall recess 106 but without applying significant force on the cell as it not required here.

The optical pressure cell 102 comprises a deformable reflective pressure cell diaphragm 110 bonded or welded in its periphery on the pressure cell front side 102a. With the surface of the Fabry-Perot cavity 140 being composed of reflective material, an operable Fabry-Perot cavity 140 is therefore designed within the optical pressure cell 102 with the depth of the Fabry-Perot cavity 140 varying under pressure. When the diaphragm 110 is deformed under the difference of pressure at the front input pressure port 152 and the Fabry-Perot cavity 140, the distance between two reflective surfaces varies.

The location of the optical pressure cell 102 within the sensor housing 104 defines and divides two distinct areas: a front area 122 and a back area 124. The front area 122 is delimited by the housing front wall 104a, the housing side wall 104c and the pressure cell front side 102a, namely the diaphragm 110. The back area 124 is delimited by the housing back wall 104b, the housing side wall 104c and the pressure cell back side 102b. In this embodiment, the optical Fabry-Perot absolute pressure sensor 10 is circular when viewed from the top and therefore there is a single housing side wall 104c. From a three-dimensional perspective, the front area 122 and a back area 124 may also be referred to as volumes or spaces which contain a fluid exerting its pressure on the optical pressure cell 102. The front area 122 and a back area 124 may therefore be referred to as a first fluid space and second fluid space, respectively. The housing side wall 104c is also referred to as the shared wall since it is contributes to define both the first fluid space (front area 122) and the second fluid space (back area 124).

The optical Fabry-Perot absolute pressure sensor 10 further comprises an optical fiber assembly 20 passing through the housing back wall 104b to have its extremity in the back area 124. The optical fiber assembly 20 comprises a bi-directional optical fiber 130 located in a protective coating or tubing 132 with its extremity housed in a ferrule 134 attached to the sensor housing 104 within a hole in the housing back wall 104b. The bi-directional optical fiber 130 extremity ends in the proximity of a lens 136. A sealing window 138 is affixed to the ferrule 134 to seal the optical fiber assembly 20. The distal end of the optical fiber assembly is located in the proximity of the back side 102b of the optical pressure cell 102 in an operative manner for light beams to be transmitted and captured between the bi-directional optical fiber 130 and the optical pressure cell 102. Limiting the distance between the end of the optical fiber assembly and the back side 102b of the optical pressure cell 102 is also advantageous for reducing the shifting of the optical beam caused by a change of the index of refraction of the fluid present in the back area 124 of the of the optical pressure cell.

Located in the housing front wall 104a, a front input pressure port 152, that consists in a conduit (aka a front conduit) passing through the housing front wall 104a, allows the fluid in the surrounding area to which the front input pressure port 152 is connected or immersed (at pressure $P_i$, aka the fluid pressure at the front input pressure port 152) to enter in the front area 122. A pressure equalization port 156 is located in the housing side wall 104c. The pressure equalization port 156 consists in a conduit connecting the front area 122 with the back area 124. The pressure equalization port 156 allows fluid to communicate between the front area 122 and the back area 124. Accordingly, the optical pressure cell 102 is exposed to the same pressure on its front side 102a ($P_f$) and its back side 102b ($P_b$), and is therefore free-floating in the fluid present in the sensor housing 104. Furthermore and because the mounting clamps 108 are not used for sealing purposes, very little amount of clamping force is required to maintain the optical pressure cell 102 in the housing side wall recess 106. With this configuration the optical pressure cell 102 is thereby not exposed to mechanical stresses that would be caused by a difference in pressure between the back side 102b and the front side 102a of the optical pressure cell 102. This is because pressures on both sides of the pressure cell are substantially the same, that is, $P_b = P_f = P_i$. A because there is no needs for sealing the optical pressure cell against the sensor housing, the significant forces normally required for a leak-tight sealing between the seal body and the optical pressure cell are not present.

With the embodiment of the optical Fabry-Perot absolute pressure sensor 10, the aforementioned issues of induced mechanical stresses seen with previous configurations are resolved. With the embodiment illustrated on FIG. 1, the fluid pressure at the front input pressure port 152 is applied on both the cell front side 102a and cell back side 102b of the optical pressure cell 102. Therefore, the optical pressure cell 102 is not exposed to mechanical stress due to a difference in pressure between the cell front side 102a and cell back side 102b. Another advantage of this embodiment is that it eliminates the need for a pressure seal body. Since the pressure is equalized all around the optical pressure cell 102, there is no need for sealing the optical pressure cell against the sensor housing 104. This eliminates a well-known potential source of mechanical stress on the optical pressure cell 102 when dealing with high pressure mechanical seals.

Figure 2:
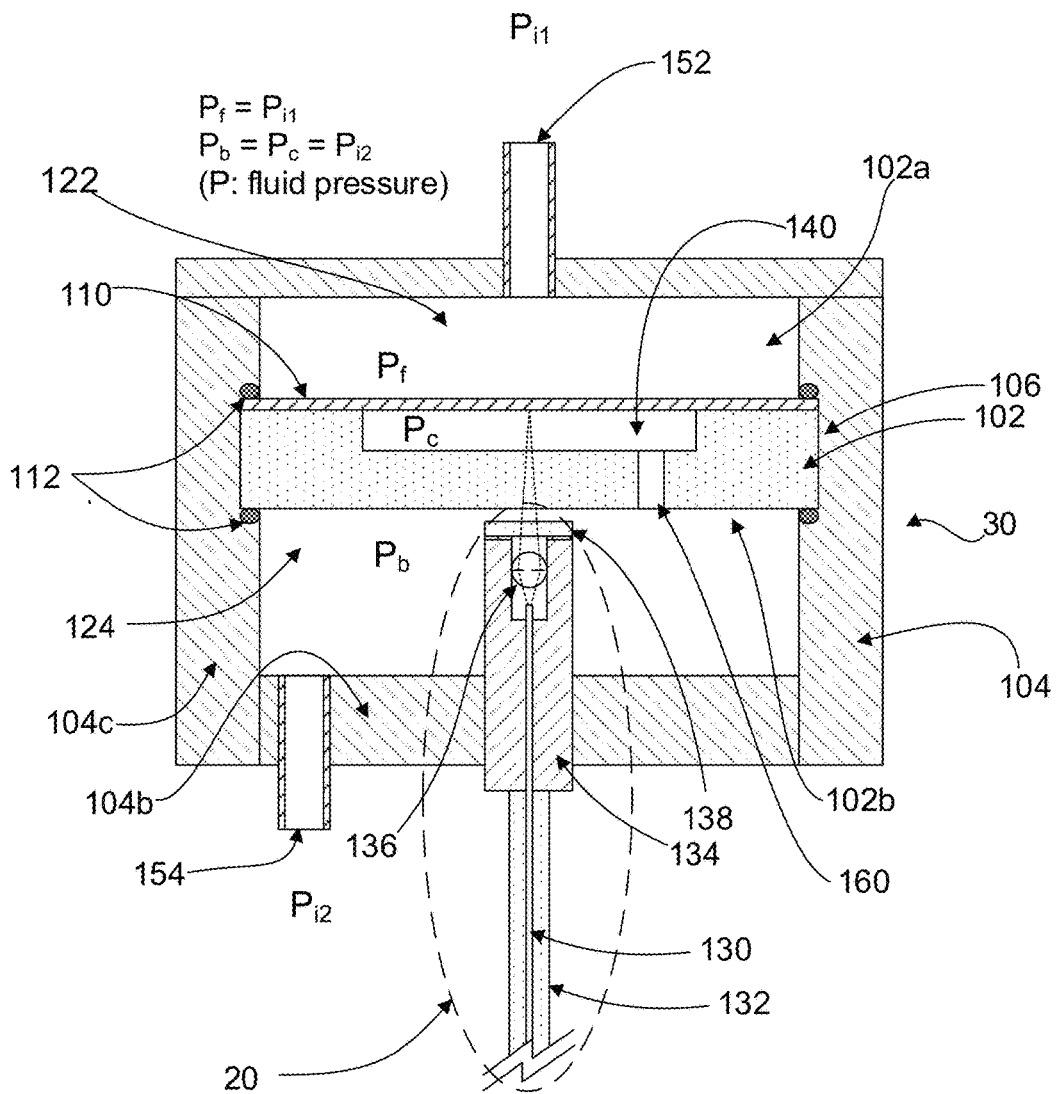
FIG. 2 is a section view illustrating an optical Fabry-Perot differential pressure sensor in accordance with a second embodiment of the present invention.
Figure 3:
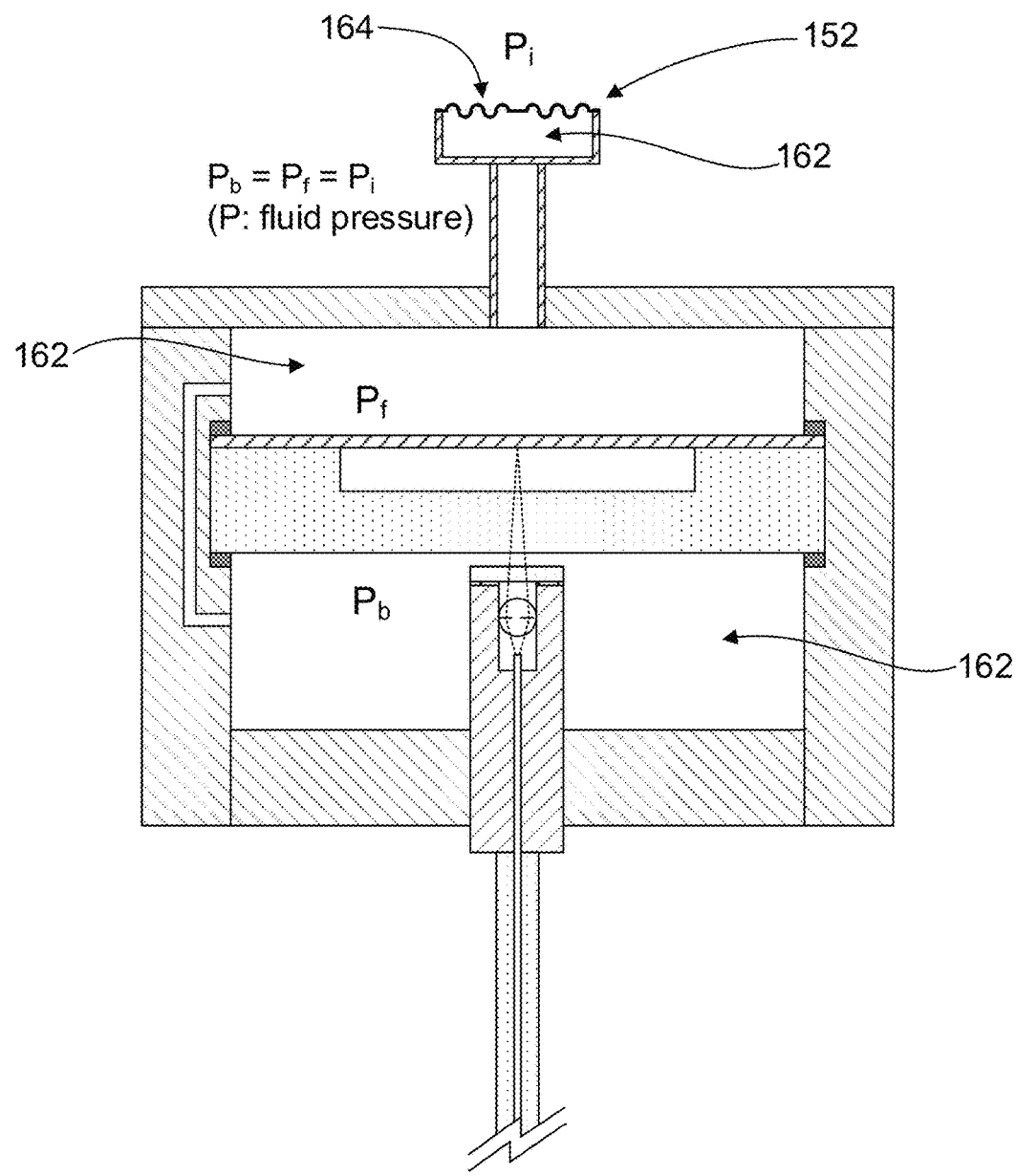
FIG. 3 is a section view illustrating an optical Fabry-Perot absolute pressure sensor arranged to protect the sensor cell against corrosive or opaque fluids in accordance with a third embodiment of the present invention.
Figure 4:
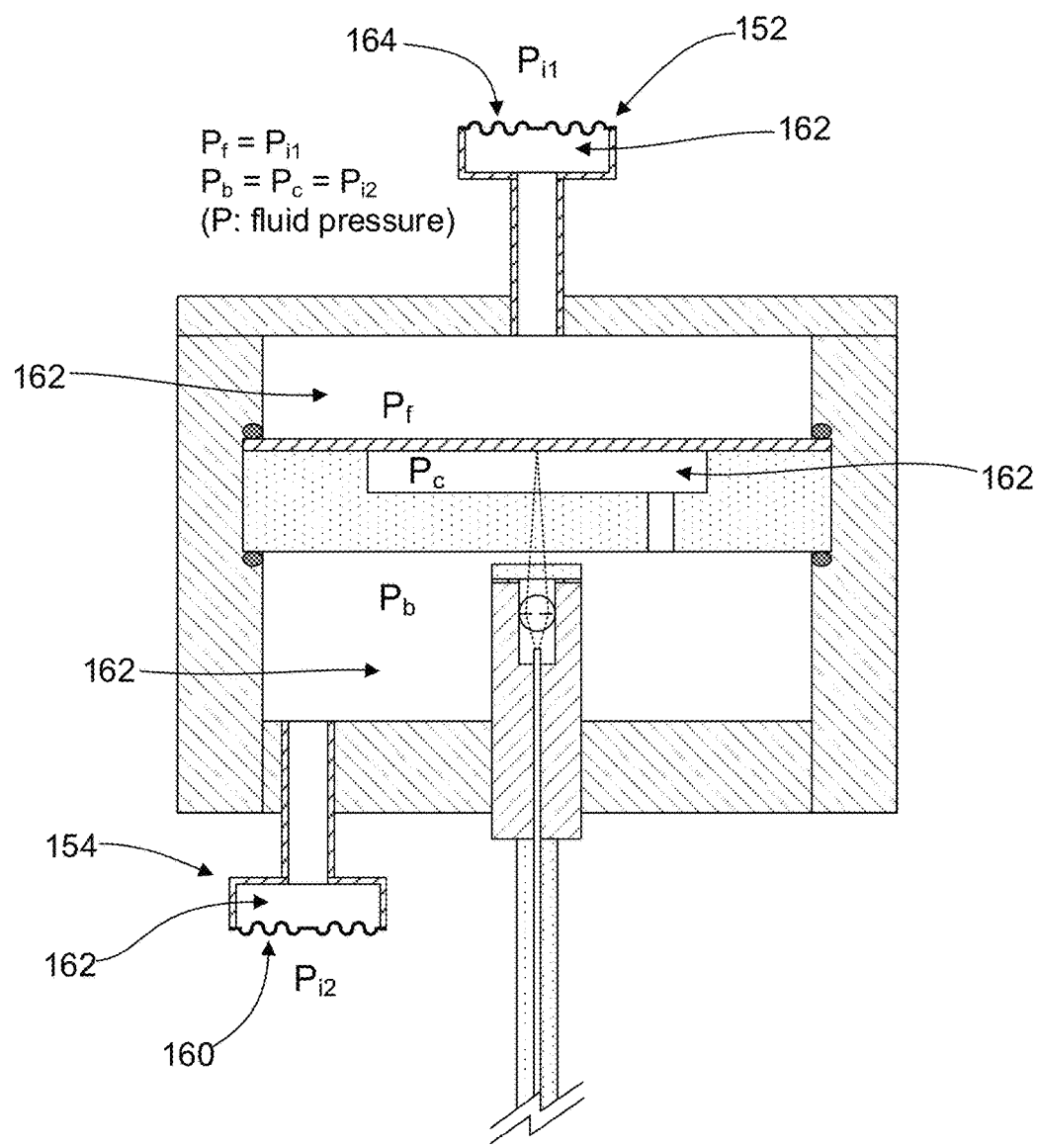
FIG. 4 is a section view illustrating an optical Fabry-Perot differential pressure sensor arranged to protect the sensor cell against corrosive or opaque fluids in accordance with a fourth embodiment of the present invention.
Figure 5:
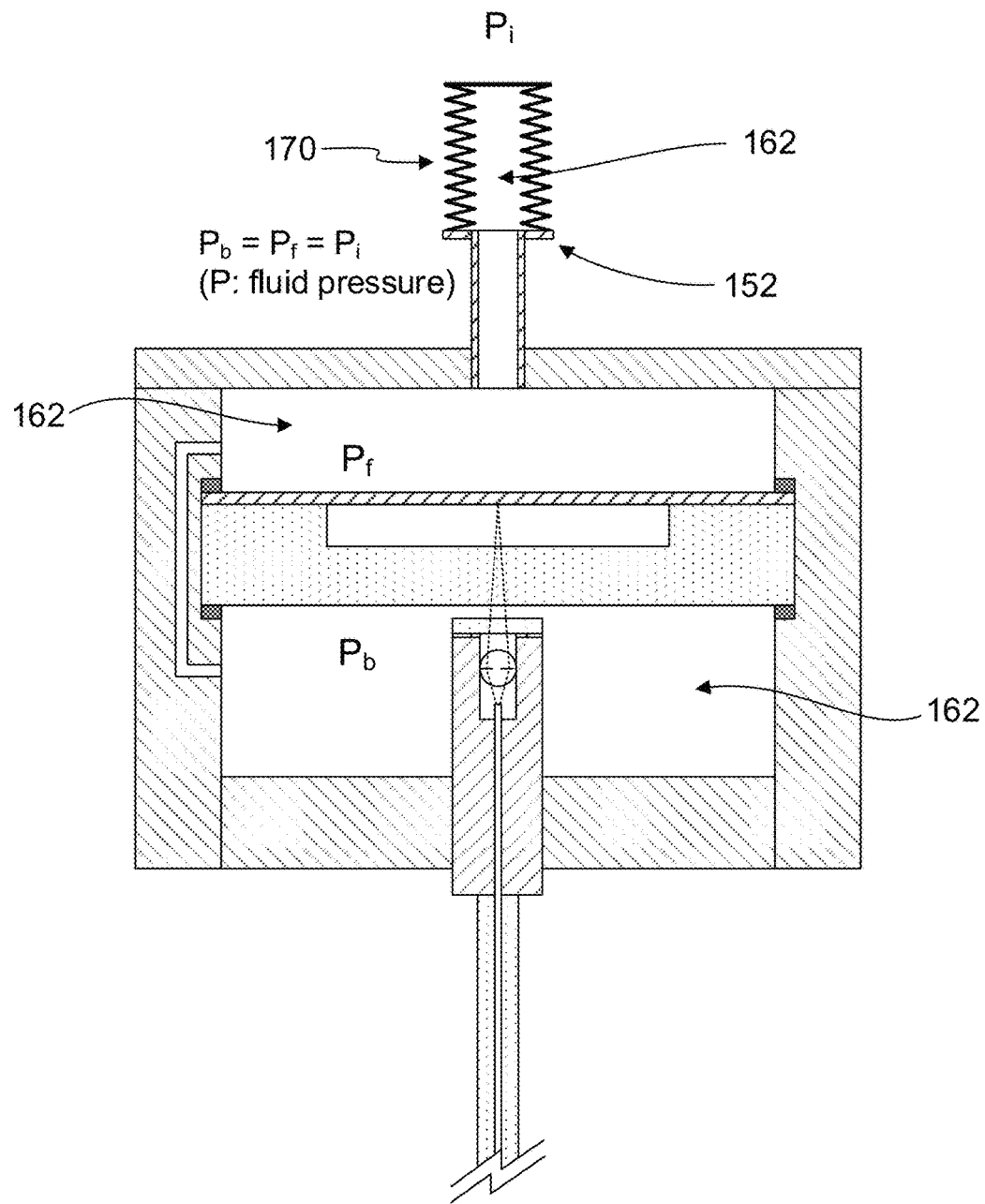
FIG. 5 is a section view illustrating an optical Fabry-Perot absolute pressure sensor arranged to protect the sensor cell against corrosive or opaque fluids in accordance with a fifth embodiment of the present invention.
Figure 6:
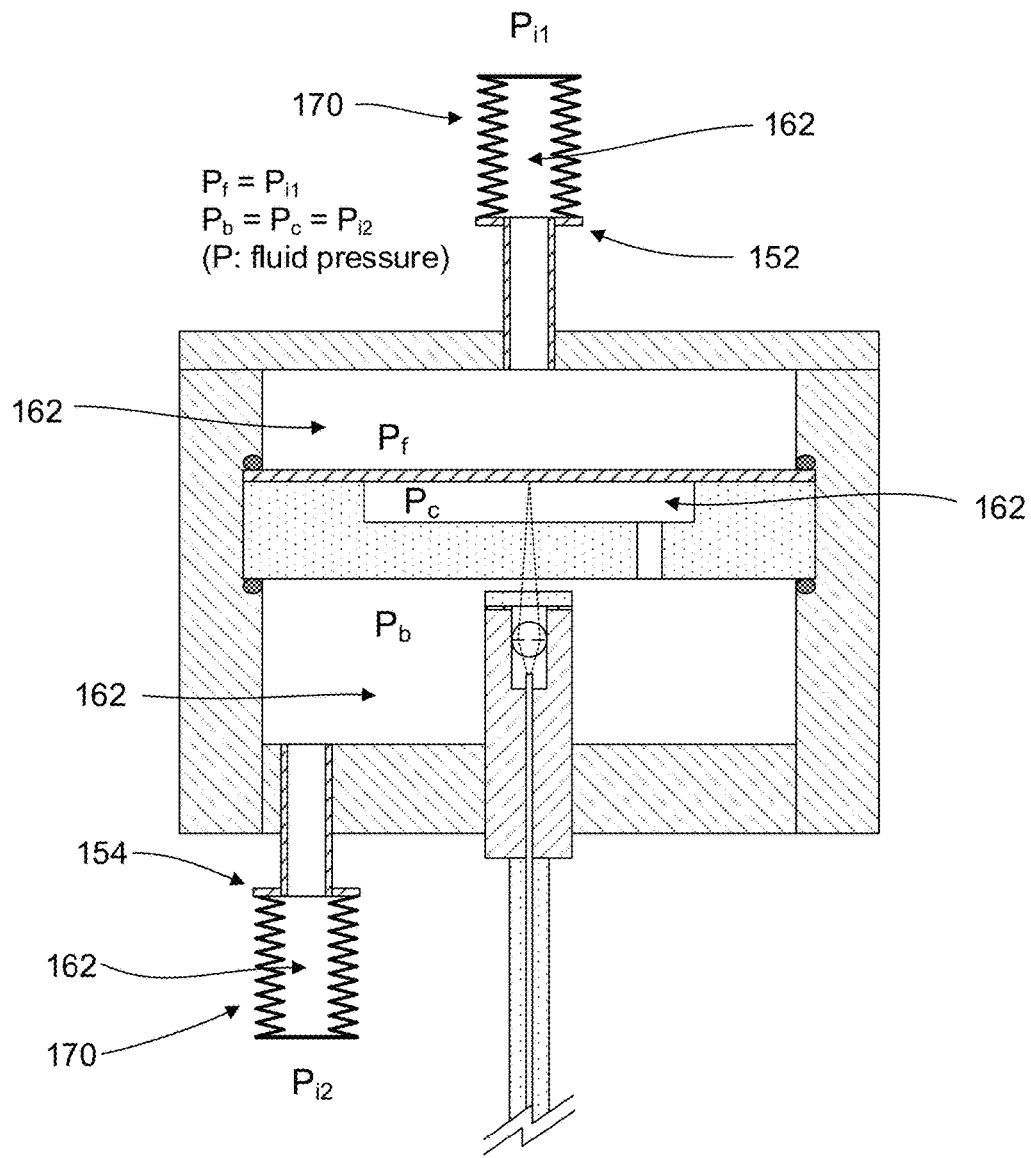
FIG. 6 is a section view illustrating an optical Fabry-Perot differential pressure sensor arranged to protect the sensor cell against corrosive or opaque fluids in accordance with a sixth embodiment of the present invention.

Referring now to FIG. 2, an alternative embodiment of an optical Fabry-Perot pressure sensor 30 is illustrated according to a section view.

The optical Fabry-Perot pressure sensor 30 features similar components as those of the optical Fabry-Perot absolute pressure sensor 10 of the first embodiment, namely a sensor housing 104, an optical pressure cell 102 and an optical fiber assembly 20. The optical Fabry-Perot pressure sensor 30 further comprises a front input pressure port 152 located on the housing front wall 104a and letting the surrounding fluid present at this port (at pressure PH, aka the pressure in the immediate environment outside the pressure sensor near the front input pressure port 152) enter the front area 122 and therefore permitting equalization of the pressure in the front area 122 ($P_f$) with the pressure ($P_{i1}$) existing at the front input pressure port 154; that is, $P_f = P_{i1}$.

Similarly, the housing back wall 104b features a back input pressure port 154. The back input pressure port 154 is a conduit letting the surrounding fluid present at this port (at pressure $P_{t2}$ aka the pressure in the immediate environment outside the pressure sensor near the back input pressure port 154), in the housing back wall 104b of the sensor housing 104, enter the optical Fabry-Perot pressure sensor 30, this time in the back area 124 (at pressure $P_b$). Soft sealing body 112 replaces the mounting clamps 108 of the first embodiment as mounting components. The soft sealing body 112 prevents fluid communication between the front area 122 and the back area 124. A vent channel 160 passing through the optical pressure cell 102 up to the Fabry-Perot cavity 140 equalizes the pressure behind the diaphragm 110 (Pc) with the pressure at the back side 102b ($P_b$) of the optical pressure cell 102; that is, $P_b=P_c=P_{t2}$. The Fabry-Perot cavity 140 therefore permits to measure the difference of pressure between the front area 122 and the back area 124.

Accordingly, this configuration is particularly attractive for measuring small pressure differences between the two input ports at high static pressure (which would result in high mechanical stresses with prior pressure sensors) with the aforementioned low stress benefits.

With reference to FIGS. 3, 4, 5 and 6, in the presence of chemically aggressive fluids, it is required to protect the optical pressure cell and other sensitive components that could be damaged by corrosion or other types of chemical ingression. Liquid-filled pressure sensor is a well-known method for protecting the sensor against chemically aggressive fluids. For example, oil-filled, silicon MEMs technology pressure sensors have proven to be useful in various industries.

The basic construction of liquid-filled pressure sensor involves a thin corrugated diaphragm 164 (FIGS. 3-4) or bellows 170 (FIGS. 5-6), typically made from thin but chemically resistant metal alloys. The diaphragm or bellows seals the chamber where the optical pressure cell is located, isolating the cell from the process fluid whose pressure is being measured. The chamber is filled with fill-fluid 162, such as silicone oil, alkylated-aromatic oil or mineral oil, for example. The use of liquid, ideally with low compressibility property, is necessary to transfer the pressure applied to the diaphragm or bellow to the optical pressure cell. In the conditions where the sensor is used within a large temperature range, the use of bellows is preferred, as it allows accounting for larger thermal expansion of the fill-fluid 162.

Alternative embodiments, not illustrated, involve alternative designs and alternative locations for the pressure equalization port 156 permitting to the fluid to be communicated between the front area 122 and the back area 124, and therefore generate the desired pressure equilibrium (i.e., limitation or elimination of the pressure differences around the optical pressure cell 102). For instance, alternative designs of the sensor housing 104, alternative locations for the front input pressure port 152 and back input pressure port 154 are also possible without departing from the scope of the invention.

Similarly, alternative solutions exist for fixing the optical pressure cell 102 within the sensor housing 104 without departing from the scope of the invention. For example, various mounting and clamping methods are given in the book entitled "Mounting Optics in Optical Instruments", by Paul R Yoder Jr. Many of the mounting and clamping methods described in this book could be used for mounting the optical pressure cell 102 for purposes similar to those presented herein but do not need to be described further. According to alternative housing designs, the way the optical pressure cell 102 is maintained in location in the sensor housing 104 may vary, and may either require the illustrated side wall recess 106 or not, or alternative configurations and/or components can be provided to secure the optical pressure cell 102 in place without applying force inducing mechanical stresses on the optical pressure cell 102. Similarly, those skilled in the art will understand that there exists various ways to achieve pressure equalization as described herein. For example orifices or channels could be made in the mounting clamp 108 proving same pressure on both side of the optical pressure cell.

It should be noted that FIGS. 1 to 6 illustrate various embodiments of fluid communication arrangements which are useful in allowing pressure equalization between the pressure in the first fluid space on the front side and the pressure in the second fluid space on the back side of the optical pressure cell. These fluid communication arrangements include the various passages, ports, conduits, vents, bellows, corrugated diaphragms, holes, etc.

According to yet another non-illustrated embodiment, a conduit is incorporated directly in the body of the optical pressure cell 102 and through diaphragm 110. In such a case, pressure equalization port 156 would not be required since the conduit in the optical pressure cell 102 would provide the fluid communication arrangement between the first fluid space and the second fluid space. A similar, yet slightly different embodiment, would be possible where the diaphragm 110 does not cover the entire front side 102a of the optical pressure cell 102. In such a case, a conduit is incorporated in the body of the optical pressure cell 102 only in an area where the diaphragm 110 does not cover the front side 102a of the optical pressure cell 102.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:
1. An optical pressure sensor comprising:
a sensor housing;
an optical pressure cell mounted within the sensor housing and dividing the sensor housing into a first fluid space and a second fluid space, the optical pressure cell comprising a front side exposed to a pressure in the first fluid space and a back side exposed to a pressure in the second fluid space; and
a fluid communication conduit allowing pressure equalization between the pressure in the first fluid space on the front side and the pressure in the second fluid space on the back side of the optical pressure cell.
2. The pressure sensor of claim 1, wherein the fluid communication conduit extends within the sensor housing from the second fluid space to the first fluid space hence allowing fluid communication and eliminating a difference in pressure between the second fluid space and the first fluid space.
3. The pressure sensor of claim 2, wherein the sensor housing comprises walls delimiting the first fluid space and the second fluid space, one of the walls being common to the first fluid space and the second fluid space, namely a shared wall, and the fluid communication conduit extending from the second fluid space to the first fluid space is provided in the shared wall.
4. The pressure sensor of claim 3, wherein the sensor further comprises a front wall further delimiting the first fluid space and wherein a front input pressure port is defined in the front wall and provides fluid communication between the first fluid space and an immediate environment outside the pressure sensor near the front input pressure port.

5. The pressure sensor of claim 4, wherein the front input pressure port comprises one of a bellow and a corrugated diaphragm to communicate pressure while preventing ingress of fluid from the immediate environment outside the pressure sensor near the front input pressure port to the first fluid space.

6. The pressure sensor of claim 2, further comprising non-sealing mounting clamps to secure the optical pressure cell to the sensor housing.

7. The pressure sensor of claim 1, wherein the optical pressure cell comprises a Fabry-Perot cavity having a diaphragm being exposed to the pressure in the first fluid space, the optical pressure cell for measuring a pressure difference between the first fluid space and the Fabry-Perot Cavity; and where the fluid communication conduit allows fluid communication and eliminates a difference in pressure between the second fluid space and one of the first fluid space and the Fabry-Perot cavity.

8. The pressure sensor of claim 7, wherein the optical pressure cell defines a vent channel extending within the optical pressure cell from the second fluid space to the Fabry-Perot cavity hence providing the fluid communication conduit allowing fluid communication and eliminating a difference in pressure between the second fluid space and the Fabry-Perot cavity.

9. The pressure sensor of claim 8, wherein the sensor housing further comprises:
 a front wall delimiting the first fluid space and wherein a front input pressure port is defined in the front wall and provides fluid communication between the first fluid space and an immediate environment outside the pressure sensor near the front input pressure port; and
 a back wall delimiting the second fluid space and wherein a back input pressure port is defined in the back wall and provides fluid communication between the second fluid space and an immediate environment outside the pressure sensor near the back input pressure port.

10. The pressure sensor of claim 9, wherein the front input pressure port and the back input pressure port each comprises one of a bellow and a corrugated diaphragm to communicate pressure while respectively preventing ingress of fluid from the immediate environment outside the pressure sensor near the front input pressure port to the first fluid space and the immediate environment outside the pressure sensor near the back input pressure port.

11. The pressure sensor of claim 8, further comprising a soft sealing body that prevents fluid from flowing between the first fluid space and the second fluid space.

12. The pressure sensor of claim 1, further comprising an optical fiber assembly having a distal end located in the second fluid space proximate the optical pressure cell in an operative manner for transmission and reception of light beams between the optical fiber assembly and the optical pressure cell.

13. The pressure sensor of claim 12, wherein the sensor housing further comprises a back wall delimiting the second fluid space and wherein a hole is practiced in the back wall, wherein the optical fiber assembly passes through the hole.

14. The pressure sensor of claim 13, wherein the optical fiber assembly comprises an optical fiber and a ferrule housing the optical fiber at the distal end of the optical fiber assembly and further wherein the hole is adapted to hold the ferrule in the back wall.

15. An optical pressure sensor comprising:
 a sensor housing;
 an optical pressure cell mounted within the sensor housing and dividing the sensor housing into a first fluid space and a second fluid space, the optical pressure cell comprising a Fabry-Perot cavity having a diaphragm being exposed to a pressure in the first fluid space, the optical pressure cell for measuring a pressure difference between the first fluid space and the Fabry-Perot Cavity; and
 a fluid communication conduit allowing fluid communication and eliminating a difference in pressure between the second fluid space and one of the first fluid space and the Fabry-Perot cavity.

* * * * *